(12) United States Patent
Landis et al.

(10) Patent No.: US 11,606,183 B2
(45) Date of Patent: Mar. 14, 2023

(54) INDICATIONS OF CAPABILITIES FOR SELF-INTERFERENCE CANCELLATION

(71) Applicant: QUALCOMM Incorporated, San Diego, CA (US)

(72) Inventors: Shay Landis, Hod Hasharon (IL); Idan Michael Horn, Hod Hasharon (IL)

(73) Assignee: QUALCOMM Incorporated, San Diego, CA (US)

( * ) Notice: Subject to any disclaimer, the term of this patent is extended or adjusted under 35 U.S.C. 154(b) by 18 days.

(21) Appl. No.: 17/229,330

(22) Filed: Apr. 13, 2021

(65) Prior Publication Data

US 2022/0329402 A1 Oct. 13, 2022

(51) Int. Cl.
| H04L 5/00 | (2006.01) |
| H04W 8/24 | (2009.01) |
| H04B 1/525 | (2015.01) |
| H04W 72/04 | (2023.01) |
| H04L 5/14 | (2006.01) |

(52) U.S. Cl.
CPC ............ *H04L 5/0098* (2013.01); *H04B 1/525* (2013.01); *H04L 5/1407* (2013.01); *H04W 8/24* (2013.01); *H04W 72/048* (2013.01); *H04W 72/0413* (2013.01)

(58) Field of Classification Search
CPC . H04W 8/24; H04W 72/0413; H04W 72/048; H04L 5/0098; H04L 5/1407; H04B 1/525
See application file for complete search history.

(56) References Cited

U.S. PATENT DOCUMENTS

| 2018/0212746 A1* | 7/2018 | Kazmi | ................ H04L 1/1825 |
| 2022/0116923 A1* | 4/2022 | Kim | ..................... H04L 5/001 |
| 2022/0182160 A1* | 6/2022 | Su | ...................... H04B 17/345 |

FOREIGN PATENT DOCUMENTS

WO    WO-2017111905 A1 * 6/2017

* cited by examiner

*Primary Examiner* — Brian P Cox

(74) *Attorney, Agent, or Firm* — Arun Swain; Harrity & Harrity, LLP

(57) ABSTRACT

Various aspects of the present disclosure generally relate to wireless communication. In some aspects, a user equipment (UE) may transmit an indication of capabilities of the UE for self-interference cancellation at one or more center frequencies. The UE may receive an indication of a configuration, based at least in part on the indication of capabilities, associated with one or more subsequent communications. Numerous other aspects are described.

30 Claims, 10 Drawing Sheets

INDICATIONS OF CAPABILITIES FOR SELF-INTERFERENCE CANCELLATION

FIELD OF THE DISCLOSURE

Aspects of the present disclosure generally relate to wireless communication and to techniques and apparatuses for indications of capabilities for self-interference cancellation.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a B S via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes transmitting an indication of capabilities of the UE for self-interference cancellation at one or more center frequencies; and receiving an indication of a configuration, based at least in part on the indication of capabilities, associated with one or more subsequent communications.

In some aspects, a method of wireless communication performed by a base station includes receiving an indication of capabilities of a UE for self-interference cancellation at one or more center frequencies; and transmitting an indication of a configuration, based at least in part on the indication of capabilities, associated with one or more subsequent communications.

In some aspects, a UE for wireless communication includes a memory; and one or more processors, coupled to the memory, configured to: transmit an indication of capabilities of the UE for self-interference cancellation at one or more center frequencies; and receive an indication of a configuration, based at least in part on the indication of capabilities, associated with one or more subsequent communications.

In some aspects, a base station for wireless communication includes a memory; and one or more processors, coupled to the memory, configured to: receive an indication of capabilities of a UE for self-interference cancellation at one or more center frequencies; and transmit an indication of a configuration, based at least in part on the indication of capabilities, associated with one or more subsequent communications.

In some aspects, a non-transitory computer-readable medium storing a set of instructions for wireless communication includes one or more instructions that, when executed by one or more processors of a UE, cause the UE to: transmit an indication of capabilities of the UE for self-interference cancellation at one or more center frequencies; and receive an indication of a configuration, based at least in part on the indication of capabilities, associated with one or more subsequent communications.

In some aspects, a non-transitory computer-readable medium storing a set of instructions for wireless communication includes one or more instructions that, when executed by one or more processors of a base station, cause the base station to: receive an indication of capabilities of a UE for self-interference cancellation at one or more center frequencies; and transmit an indication of a configuration, based at least in part on the indication of capabilities, associated with one or more subsequent communications.

In some aspects, an apparatus for wireless communication includes means for transmitting an indication of capabilities of the apparatus for self-interference cancellation at one or more center frequencies; and means for receiving an indication of a configuration, based at least in part on the indication of capabilities, associated with one or more subsequent communications.

In some aspects, an apparatus for wireless communication includes means for receiving an indication of capabilities of a UE for self-interference cancellation at one or more center frequencies; and means for transmitting an indication of a configuration, based at least in part on the indication of capabilities, associated with one or more subsequent communications.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antenna, RF chains, power amplifiers, modulators, buffer, processor(s), interleaver, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
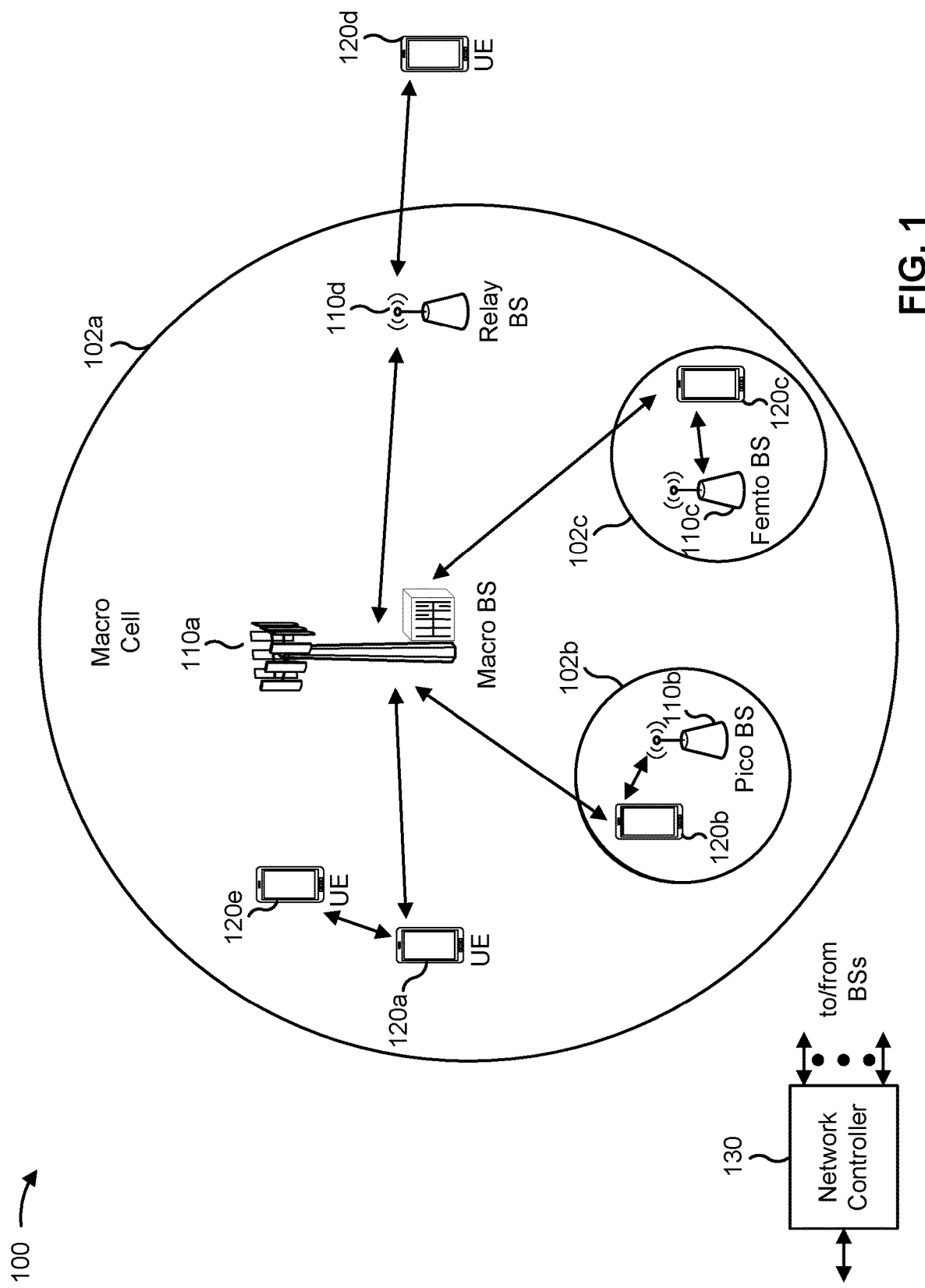
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
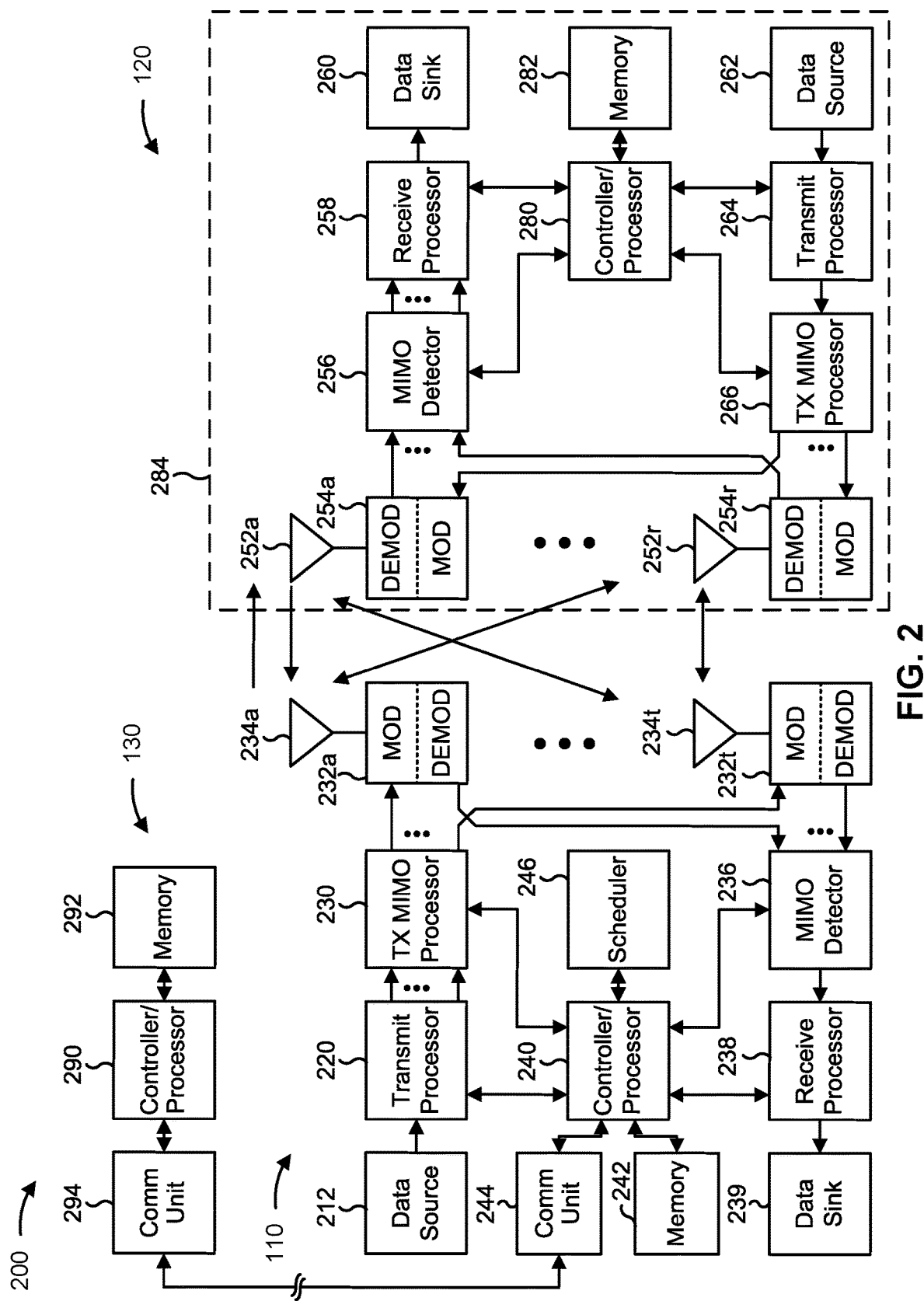
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 6-8.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 6-8.

Controller/processor 240 of base station 110, controller/processor 280 of UE 120, and/or any other component(s) of FIG. 2 may perform one or more techniques associated with indications of capabilities for self-interference cancellation, as described in more detail elsewhere herein. For example, controller/processor 240 of base station 110, controller/processor 280 of UE 120, and/or any other component(s) of FIG. 2 may perform or direct operations of, for example, process 700 of FIG. 7, process 800 of FIG. 8, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 700 of FIG. 7, process 800 of FIG. 8, and/or other processes as described herein. In some aspects, executing instructions may include running the instructions, converting the instructions, compiling the instructions, and/or interpreting the instructions, among other examples.

In some aspects, the UE includes means for transmitting an indication of capabilities of the UE for self-interference cancellation at one or more center frequencies; or means for receiving an indication of a configuration, based at least in part on the indication of capabilities, associated with one or more subsequent communications. The means for the UE to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the base station includes means for receiving an indication of capabilities of a UE for self-interference cancellation at one or more center frequencies; or means for transmitting an indication of a configuration, based at least in part on the indication of capabilities, associated with one or more subsequent communications. The means for the base station to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
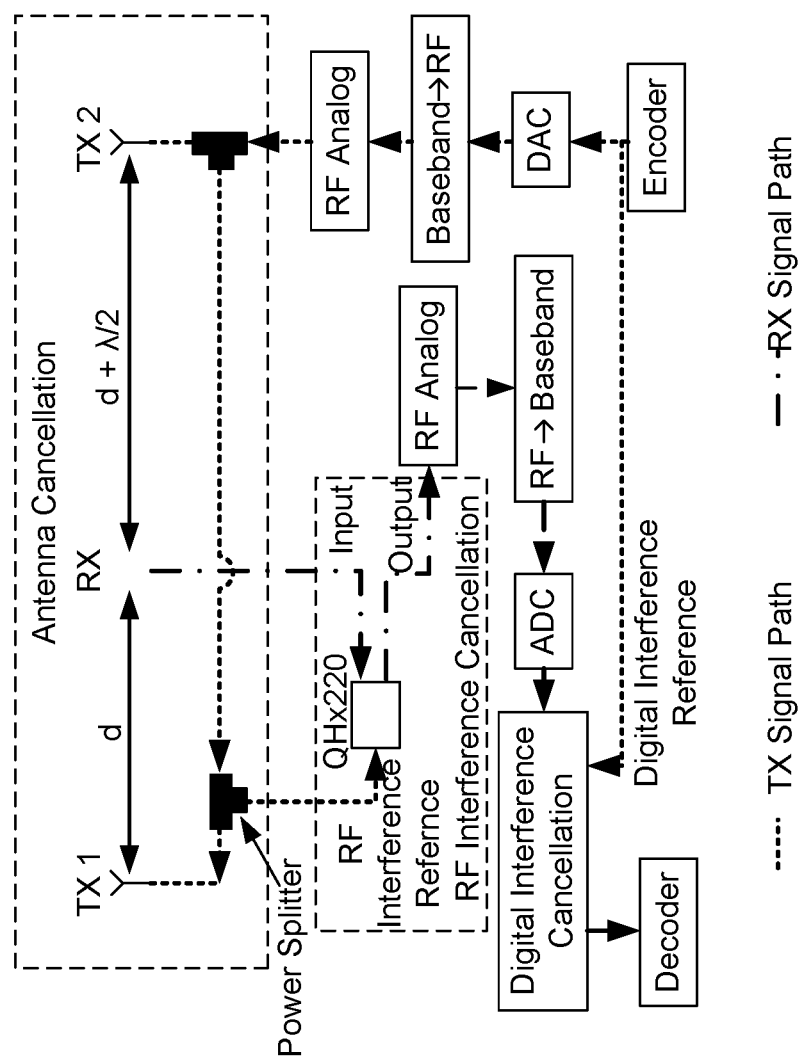
FIGS. 3-5 are diagrams illustrating examples of self-interference cancellation, in accordance with the present disclosure.

FIG. 3 is a diagram illustrating an example 300 of self-interference cancellation, in accordance with the present disclosure. As shown in example 300, a transmitting device (e.g., a UE) may be configured for antenna cancellation 305 based at least in part on distances between antenna groups.

As shown in FIG. 3, a transmission signal may follow a transmission signal path ("TX Signal Path") from an encoder to a digital to analog converter (DAC) that converts the signal to an analog signal and from the DAC to a baseband processing component that converts the signal to radio frequency (RF) resources (e.g., based at least in part on modulating the transmission signal). The baseband processing component ("Baseband to RF") may provide the transmission signal to one or more RF analog components that prepare the transmission signal for transmission over the air by an antenna group (e.g., mapping the transmission signal to a constellation).

To perform antenna cancellation 305, the transmission signal may be split, via a power splitter, between a first transmit antenna group (TX 1) and a second transmit antenna group (TX 2). The transmission signal may be further split between the first transmit antenna group and a noise canceller. As shown, the first transmit antenna group may be positioned at a distance d from a receive antenna group (RX), and the second antenna group may be positioned at a distance d+λ/2 from the receive antenna group, where A is a wavelength associated with a center frequency for which the UE is configured for self-interference cancellation.

When the UE transmits a transmission signal via the first transmit antenna group and the second transmit antenna group simultaneously, the transmission signal is configured to arrive at the receive antenna group at approximately 180 degrees out of phase. In this way, the transmission signal transmitted via the first transmit antenna group at the center frequency and transmitted via the second transmit antenna group at the center frequency will destructively interfere and/or reduce a reception power at the receive antenna group. The receive antenna group may sample signals during transmission of the transmission signal (e.g., based at least in part on being configured for full duplex communication) to attempt to receive downlink signaling. Based at least in part on destructive interference of the transmit signal at the receive antenna group, the receive antenna group may receive the downlink signaling with an improved signal-to-interference-plus-noise-ratio (SINR).

The receive antenna group may provide the sampled signals (e.g., the downlink signaling plus noise and/or interference) along a reception signal path ("RX Signal Path") to the noise canceller to perform RF interference cancellation to remove a portion of noise and/or interference caused by portions of the transmission signal that were transmitted via frequencies that vary from the center frequency. The noise canceller may provide the sampled signals to RF analog components that demap the sampled signals, and the RF analog components may provide the sampled signals to a baseband processing component ("RF to Baseband") that converts the RF signals to a baseband frequency.

An analog to digital converter (ADC) may receive the sampled signals from the ADC and convert the sampled signals from analog signals to digital signals. One or more components may perform digital interference cancellation on the sampled signals after being converted to digital signals based at least in part on receiving a portion of the transmission signal, as a digital interference reference, from the encoder. Digital interference cancellation may include refining the sampled signals to remove another portion of noise and/or interference caused by portions of the transmission signal that were transmitted via frequencies that vary from the center frequency. For example, the digital interference cancellation may include attempting to digitally remove interference in the sampled signals that are associated with the transmission signals as indicated in the digital interference reference. A decoder may receive the sampled signals after the digital interference cancellation.

As indicated above, FIG. 3 is provided as an example. Other examples may differ from what is described with regard to FIG. 3. For example, the transmission signal path may include additional components and/or may not include each of the components described in connection with example 300. Additionally, or alternatively, the reception signal path may include additional components and/or may not include each of the components described in connection with example 300

Figure 4:
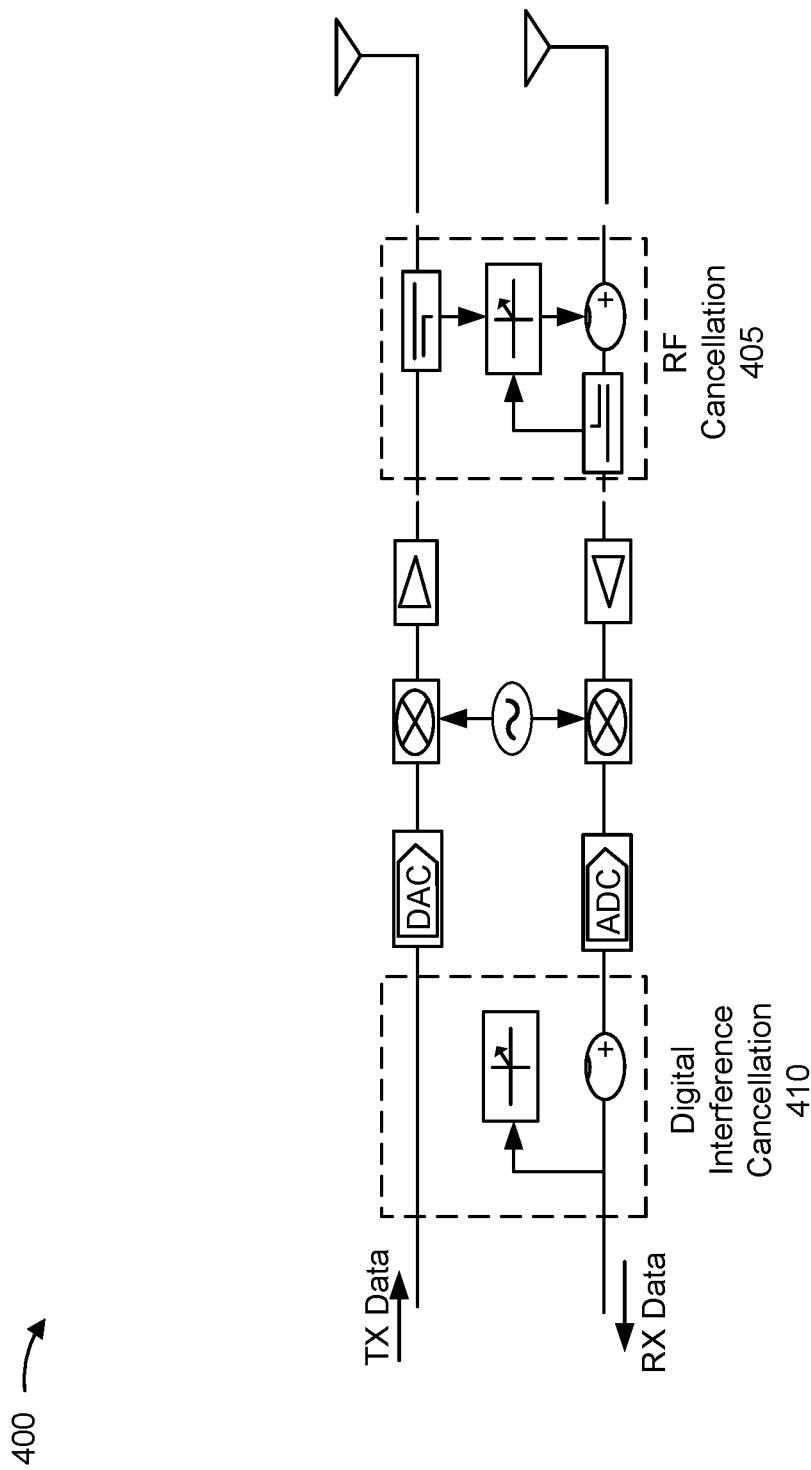

FIG. 4 is a diagram illustrating an example 400 of self-interference cancellation, in accordance with the present disclosure. As shown in example 400, a transmitting device (e.g., a UE) may be configured for RF cancellation 405 based at least in part on subtracting RF signaling associated with a transmission signal from RF signaling associated with sampled signaled received via a receive antenna group.

As shown in FIG. 4, a transmission signal may follow a transmission signal path from a DAC to a mixer that prepares the transmission signals (e.g., modulating the transmission signal, converting the transmission signal from baseband to RF resources, and/or mapping the transmission signal to a constellation, among other examples) for transmission over the air by an antenna group. A power amplifier may increase power of the transmit signal before transmission.

To perform RF cancellation 405, the transmission signal may be split, via a power splitter, between a transmit antenna group (TX) and a noise canceler that is coupled to a receive antenna group (RX). The transmission signal may be phase shifted by 180 degrees (e.g., have a sign inverted) to cancel the transmission signal when combined with sampled signals obtained via the receive antenna group. The phase shifting may be configured and/or calibrated for a center frequency. RF cancellation may include iteratively subtracting, or adding with an inverted sign, the transmission signal from the sampled signals.

After subtracting the transmission signal, the sampled signals may be provided to a power amplifier, a mixer, and/or an ADC. After the sampled signals are converted to digital signals, one or more components of the UE may perform digital interference cancellation 410 on the sampled signals. For example, the UE may perform digital interference cancellation 410 based at least in part on subtracting, or adding with an inverted sign, the transmission signal, as digital signals, from the sampled signals, as digital signals.

As indicated above, FIG. 4 is provided as an example. Other examples may differ from what is described with regard to FIG. 4. For example, the transmission signal path may include additional components and/or may not include each of the components described in connection with example 400. Additionally, or alternatively, the reception signal path may include additional components and/or may not include each of the components described in connection with example 400.

Figure 5:
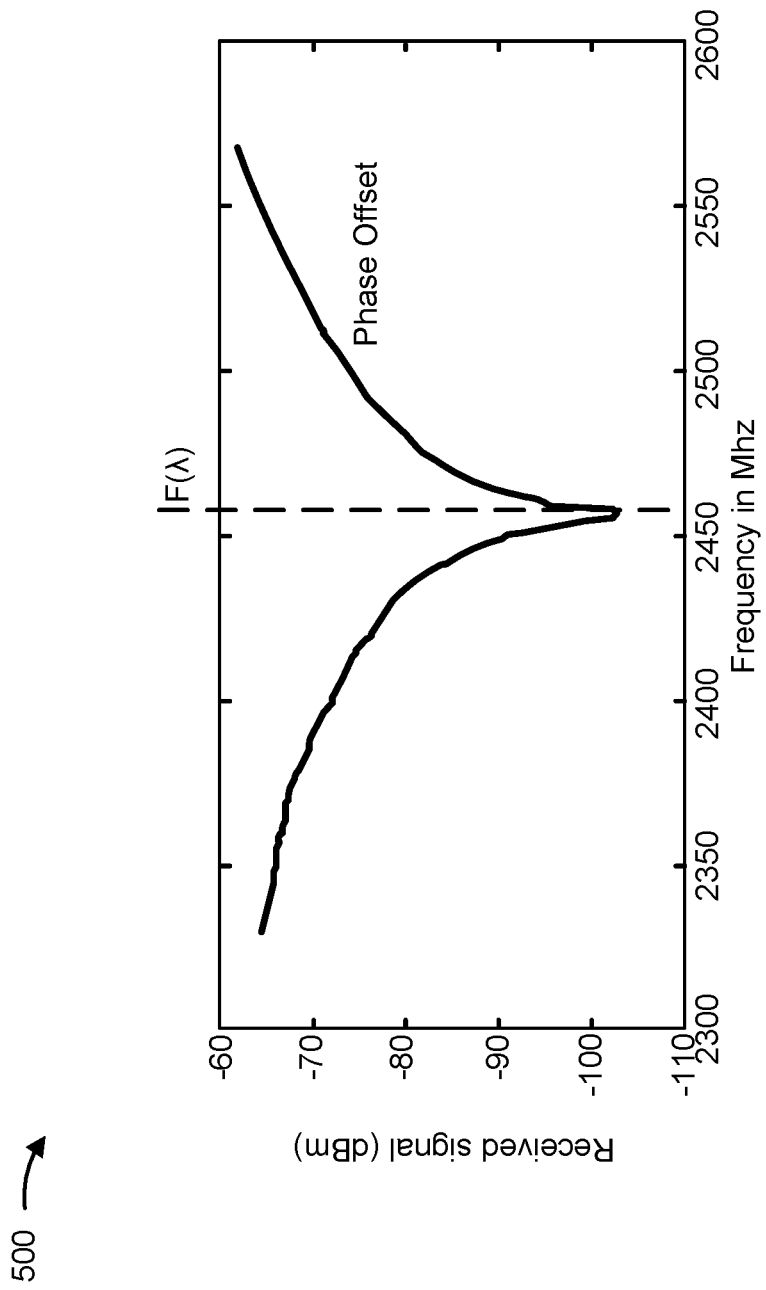

FIG. 5 is a diagram illustrating an example 500 of self-interference cancellation, in accordance with the present disclosure. As shown in example 500, a transmitting device (e.g., a UE) that is configured for self-interference cancellation may cancel interference from transmitted signals on received signals according to a curve that represents a received self-interference signal. A capability for self-interference cancellation is frequency dependent and degrades as a difference between a frequency of a transmitted signal and the center frequency ("F($\lambda$)") increases. As shown, the UE may reduce a power of a received signal (e.g., a transmitted signal received via a receive antenna group) to −105 dBm using phase offset self-interference cancellation on transmitted signals having the center frequency. The UE may reduce a power of a received signal to −72 dBm using phase offset self-interference cancellation on transmitted signals that are 50 MHz less than the center frequency. In this example, transmitted signals that are 50 MHz less than the center frequency create 33 dBm more interference than transmitted signals that are at the center frequency.

As indicated above, FIG. 5 is provided as an example. Other examples may differ from what is described with regard to FIG. 5. For example, a curve that represents a received self-interference signal may have greater or smaller slopes than the curve described in connection with example 500.

As described in connection with FIGS. 3-5, a UE may be configured to perform self-interference cancellation (e.g., for full-duplex operation) that is frequency-dependent. The UE may be required to suppress interference (e.g., using self-interference cancellation) between a transmitted signal and a received signal by a threshold amount (e.g., 110 dB or more) to communicate in full duplex operation (e.g., with an uplink bandwidth overlapping with a downlink bandwidth). However, as described in connection with FIG. 5, the UE may be unable to suppress interference between the transmitted signal and the received signal sufficiently when a frequency for uplink communications is offset a distance from a center frequency that satisfies an offset threshold. In some wireless networks, the UE may be allocated resources to communicate within a band (e.g., an FR2 band or higher frequency bands, among other examples) that includes resources that are offset a distance from the center frequency that satisfies the offset threshold.

Based at least in part on the UE being allocated resources to communicate in full duplex operation, with the allocated resources being offset from the center frequency by a distance that satisfies the offset threshold, the UE may fail to suppress interference between a transmitted signal and a received signal enough to receive downlink communications. For example, an SINR may fail to satisfy a threshold for decoding the received signal in resources that are offset from the center frequency by a distance that satisfies the offset threshold. As a result, the UE may fail to receive the downlink communications, which may cause the UE and the base station to consume computing, network, and/or power resources to detect and/or correct the failure.

In some aspects described herein, a UE may transmit an indication of capabilities of the UE for self-interference cancellation at one or more center frequencies. For example, the UE may indicate where the one or more center frequencies are located (e.g., in a frequency domain) and/or one or more communication metrics that may be used for communications using one or more bandwidths that are centered at the one or more center frequencies and/or at one or more additional frequencies (e.g., frequencies that are offset from the one or more center frequencies). An example indication of capabilities may indicate one or more frequencies (e.g., a center frequency or an additional frequency), sizes of candidate uplink allocations, and downlink MCSs for allocations that overlap with the candidate uplink allocations. In some aspects, a base station may request specific uplink allocations coupled with downlink bands to be reported in the indication of capabilities. In some aspects, the UE may report an MCS for full duplex operation using different sizes of candidate uplink allocations and/or downlink allocations and/or an MCS for half duplex operation using the different sizes of the candidate uplink allocations and/or the downlink allocations.

The base station may determine an uplink allocation, MCS, and/or whether to use full duplex operation or half duplex operation based at least in part on the indication of capabilities of the UE for self-interference cancellation. The base station may transmit an indication of a configuration, based at least in part on the indication of capabilities, associated with one or more subsequent communications. In this way, the base station and the UE may be configured to communicate using parameters (e.g., uplink allocation size and/or location, MCS, and/or full duplex mode or half duplex mode) based at least in part on capabilities of the UE for self-interference cancellation. In this way, the UE and the base station may conserve computing, network, and/or power resources that may have otherwise been consumed to detect and/or correct failure by the UE to receive a downlink communications using a downlink allocation that overlaps an uplink allocation that is a distance from a center frequency that satisfies an offset threshold (e.g., such that the UE is unable to sufficiently suppress interference from an uplink transmission).

Figure 6:
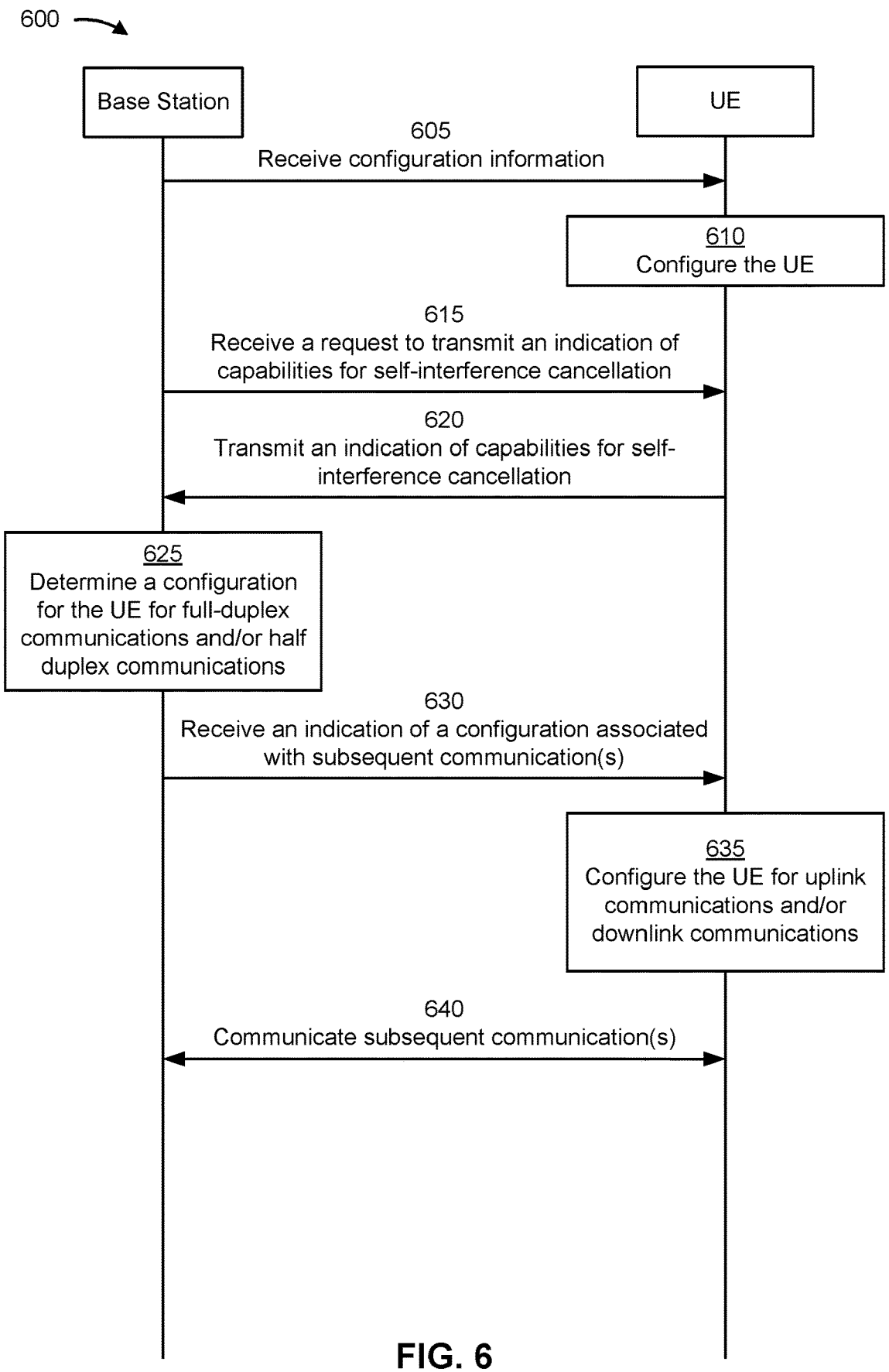
FIG. 6 is a diagram illustrating an example associated with indications of capabilities for self-interference cancellation, in accordance with the present disclosure.

FIG. 6 is a diagram illustrating an example 600 associated with indications of capabilities for self-interference cancellation, in accordance with the present disclosure. As shown in FIG. 6, a base station (e.g., base station 110) may communicate with a UE (e.g., UE 120). In some aspects, the UE and the base station may be part of a wireless network (e.g., wireless network 100).

As shown by reference number 605, the base station may transmit, and the UE may receive, configuration information. In some aspects, the UE may receive the configuration information via one or more of radio resource control (RRC) signaling, MAC control elements (MAC CEs), and/or downlink control information (DCI), among other examples. In some aspects, the configuration information may include an indication of one or more configuration parameters (e.g., already known to the UE) for selection by the UE, and/or explicit configuration information for the UE to use to configure the UE, among other examples.

In some aspects, the configuration information may indicate that the UE is to transmit an indication of capabilities for self-interference cancellation. In some aspects, the configuration information may indicate that the UE is to indicate one or more parameters associated with self-interference cancellation at one or more center frequencies. In some aspects, the configuration information may indicate a format and/or message type for transmitting the indication of capabilities for self-interference cancellation.

As shown by reference number 610, the UE may configure the UE based at least in part on the configuration information. In some aspects, the UE may be configured to perform one or more operations described herein based at least in part on the configuration information.

As shown by reference number 615, the UE may receive, and the base station may transmit, a request to transmit an indication of capabilities for self-interference cancellation. In some aspects, the request may indicate one or more pairs of uplink allocations and downlink bands for which the UE is to report capabilities for self-interference cancellation. In some aspects, the request may indicate one or more metrics to report. For example, the request may indicate that the UE is to report center frequencies, uplink allocation sizes, downlink MCSs for various allocation sizes (e.g., matching the uplink allocation size), and/or self-interference ratios above thermal noise, among other examples. In some aspects, the request may indicate one or more candidate frequencies for which the UE is to report capabilities for self-interference cancellation.

As shown by reference number 620, the UE may transmit, and the base station may receive, an indication of capabilities for self-interference cancellation. In some aspects, the UE may transmit the indication of capabilities via a report coupled to a channel state information report, via a periodic report, via an aperiodic report, and/or via a semi-persistent report. In some aspects, the indication of capabilities may include an explicit indication of capabilities and/or an implicit indication of capabilities. For example, the base station may explicitly indicate one or more metrics associated with capabilities for self-interference cancellation or may implicitly indicate the one or more metrics (e.g., based at least in part on indicating a device type associated with the one or more metrics).

In some aspects, the indication of capabilities may include one or more indications that are based at least in part on communicating in a full-duplex operation using overlapping bandwidths. For example, the indication of capabilities may be based at least in part on fully overlapping bandwidths or partially overlapping bandwidths (e.g., with offset centers and/or with a larger downlink bandwidth).

In some aspects, the indication of capabilities may indicate that the UE is configured for transmission self-interference cancellation for communications transmitted by the UE using one or more bandwidths that are centered at the one or more center frequencies and/or one or more additional frequencies. For example, the indication of capabilities may indicate capabilities for transmission self-interference cancellation at one or more center frequencies for which the UE is configured for transmission self-interference cancellation, and/or at one or more additional frequencies that are offset from the one or more center frequencies. In some aspects, the indication of capabilities may indicate self-interference cancellation that the UE supports at one or more frequencies that are offset from the one or more center frequencies and/or an indication of self-interference expected to be caused by communications transmitted by the UE at the one or more frequencies that are offset from the one or more center frequencies, among other examples.

In some aspects, the indication of capabilities may indicate one or more metrics that the UE supports for receiving a downlink communication that overlaps with transmission of an uplink communication. For example, the indication of capabilities may indicate MCSs that are supported at the one or more center frequencies and/or the one or more additional frequencies. In some aspects, the MCSs that are supported may be associated with different uplink allocation bandwidth sizes. For example, the UE may indicate that a first MCS is supported for a first uplink bandwidth size and a second MCS is supported for a second uplink bandwidth size. In some aspects, the indication of capabilities may indicate one or more metrics (e.g., MCSs) that the UE supports for full-duplex operation and/or for half-duplex operation.

In some aspects, the indication of capabilities may indicate one or more uplink bandwidth sizes that the UE supports for communications that are centered at the one or more center frequencies and/or the one or more additional frequencies. In some aspects, the one or more uplink bandwidth sizes may be based at least in part on a shape of a curve that represents a received self-interference signal and/or locations of the one or more center frequencies.

In some aspects, the indication of capabilities may indicate an amount of self-interference cancellation that the UE supports for communications that are centered at the one or more center frequencies and/or the one or more additional frequencies.

As shown by reference number 625, the base station may determine a configuration for the UE for full-duplex communications and/or half-duplex communications. In some aspects, the base station may determine whether to communicate in full duplex operation based at least in part on one or more metrics (e.g., MCS) indicating a spectral efficiency associated with the full-duplex operation being greater than a spectral efficiency associated with a half-duplex operation.

As shown by reference number 630, the UE may receive, and the base station may transmit, an indication of a configuration associated with one or more subsequent communications. In some aspects, the indication of the configuration may be based at least in part on the indication of capabilities for self-interference cancellation. In some aspects, the UE may receive the configuration within DCI, a MAC CE, and/or in an RRC message.

As shown by reference number 635, the UE may configure the UE for uplink communications and/or downlink communications based at least in part on the indication of the configuration. For example, the UE may configure one or more components of the UE to receive downlink communications and/or to transmit uplink communications using bandwidths indicated in the indication of the configuration associated with the one or more subsequent communications.

As shown by reference number 640, the UE and the base station may communicate the one or more communications. In some aspects, the UE and the base station may communicate using full-duplex operation or half-duplex operation based at least in part on the indication of the configuration associated with the one or more subsequent communications. In some aspects, the UE and the base station may communicate based at least in part on the indication of the configuration for a number of communications, for an amount of time, and/or until the base station transmits an indication of a replacement configuration, among other examples.

Based at least in part on the indication of capabilities for self-interference cancellation, and based at least in part on the base station transmitting an indication of a configuration, the base station and the UE may be configured to communicate using parameters that may reduce or avoid a failure of the UE to receive downlink communications based at least in part on self-interference in a full-duplex mode. In this way, the UE and the base station may conserve computing, network, and/or power resources that may have otherwise been consumed to detect and/or correct failure by the UE to receive a downlink communications using a downlink allocation that overlaps an uplink allocation that is a distance from a center frequency that satisfies an offset threshold (e.g., such that the UE is unable to sufficiently suppress interference from an uplink transmission).

As indicated above, FIG. 6 is provided as an example. Other examples may differ from what is described with regard to FIG. 6. For example, one or more of the described operations may be omitted and/or additional operations may be added to those described in connection with FIG. 6.

Figure 7:
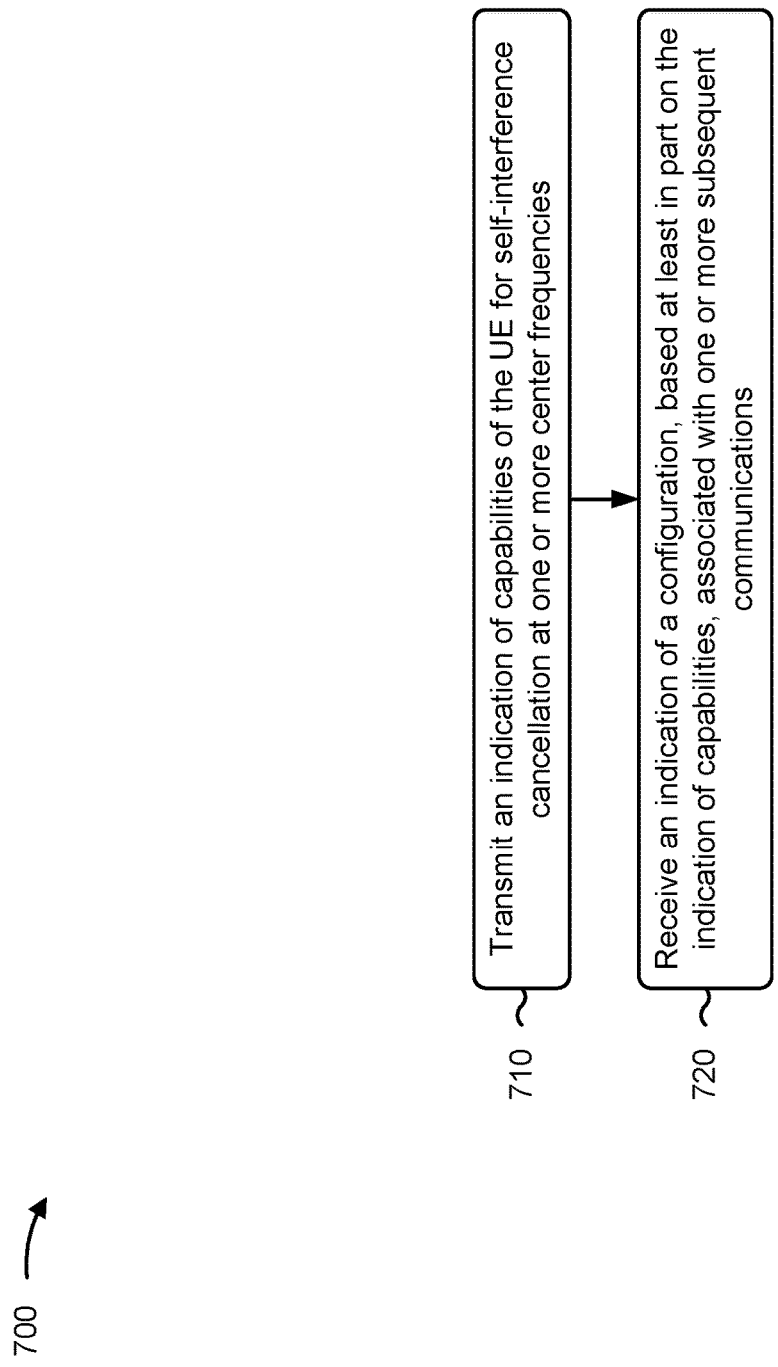
FIGS. 7 and 8 are diagrams illustrating example processes associated with indications of capabilities for self-interference cancellation, in accordance with the present disclosure.

FIG. 7 is a diagram illustrating an example process 700 performed, for example, by a UE, in accordance with the present disclosure. Example process 700 is an example where the UE (e.g., UE 120) performs operations associated with indications of capabilities for self-interference cancellation.

As shown in FIG. 7, in some aspects, process 700 may include transmitting an indication of capabilities of the UE for self-interference cancellation at one or more center frequencies (block 710). For example, the UE (e.g., using transmission component 904, depicted in FIG. 9) may transmit an indication of capabilities of the UE for self-interference cancellation at one or more center frequencies, as described above.

As further shown in FIG. 7, in some aspects, process 700 may include receiving an indication of a configuration, based at least in part on the indication of capabilities, associated with one or more subsequent communications (block 720). For example, the UE (e.g., using reception component 902, depicted in FIG. 9) may receive an indication of a configuration, based at least in part on the indication of capabilities, associated with one or more subsequent communications, as described above.

Process 700 may include additional aspects, such as any single aspect or any combination of aspects described below and/or in connection with one or more other processes described elsewhere herein.

In a first aspect, the capabilities for self-interference cancellation are based at least in part on full-duplex communications using overlapping bandwidths.

In a second aspect, alone or in combination with the first aspect, the indication of capabilities comprises an indication that the UE is configured for transmission self-interference cancellation for communications transmitted by the UE using one or more bandwidths that are centered at the one or more center frequencies.

In a third aspect, alone or in combination with one or more of the first and second aspects, the indication of capabilities comprises an indication of one or more modulation and coding schemes that the UE supports for receiving downlink communications when using, for transmitting uplink communications in a full-duplex mode, one or more bandwidths that are centered at the one or more center frequencies.

In a fourth aspect, alone or in combination with one or more of the first through third aspects, the one or more modulation and coding schemes are associated with downlink sub-bands.

In a fifth aspect, alone or in combination with one or more of the first through fourth aspects, the indication of capabilities comprises an indication of one or more additional modulation and coding schemes that the UE supports for receiving downlink communications when using, in a half-duplex mode, one or more bandwidths that are centered at the one or more center frequencies.

In a sixth aspect, alone or in combination with one or more of the first through fifth aspects, the indication of capabilities comprises an indication of one or more uplink bandwidth sizes that the UE supports for communications that are centered at the one or more center frequencies.

In a seventh aspect, alone or in combination with one or more of the first through sixth aspects, the indication of capabilities comprises an indication of an amount of self-interference cancellation that the UE supports for communications that are centered at the one or more center frequencies.

In an eighth aspect, alone or in combination with one or more of the first through seventh aspects, the indication of capabilities comprises an indication of a device type of the UE, and wherein the device type is associated with self-interference cancellation at the one or more center frequencies.

In a ninth aspect, alone or in combination with one or more of the first through eighth aspects, process 700 includes receiving a request to transmit the indication of capabilities.

In a tenth aspect, alone or in combination with one or more of the first through ninth aspects, the request to transmit the indication of capabilities indicates one or more pairs of uplink allocations and downlink bands for which the UE is to report capabilities for self-interference cancellation.

In an eleventh aspect, alone or in combination with one or more of the first through tenth aspects, transmitting the indication of capabilities comprises one or more of transmitting the indication of capabilities via a report coupled to a channel state information report, transmitting the indication of capabilities via a periodic report, transmitting the indication of capabilities via an aperiodic report, or transmitting the indication of capabilities via a semi-persistent report.

In a twelfth aspect, alone or in combination with one or more of the first through eleventh aspects, the indication of capabilities comprises an indication of self-interference cancellation that the UE supports at one or more offsets from the one or more center frequencies, or wherein the indication of capabilities comprises an indication of self-interference expected to be caused by communications transmitted by the UE at one or more offsets from the one or more center frequencies.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
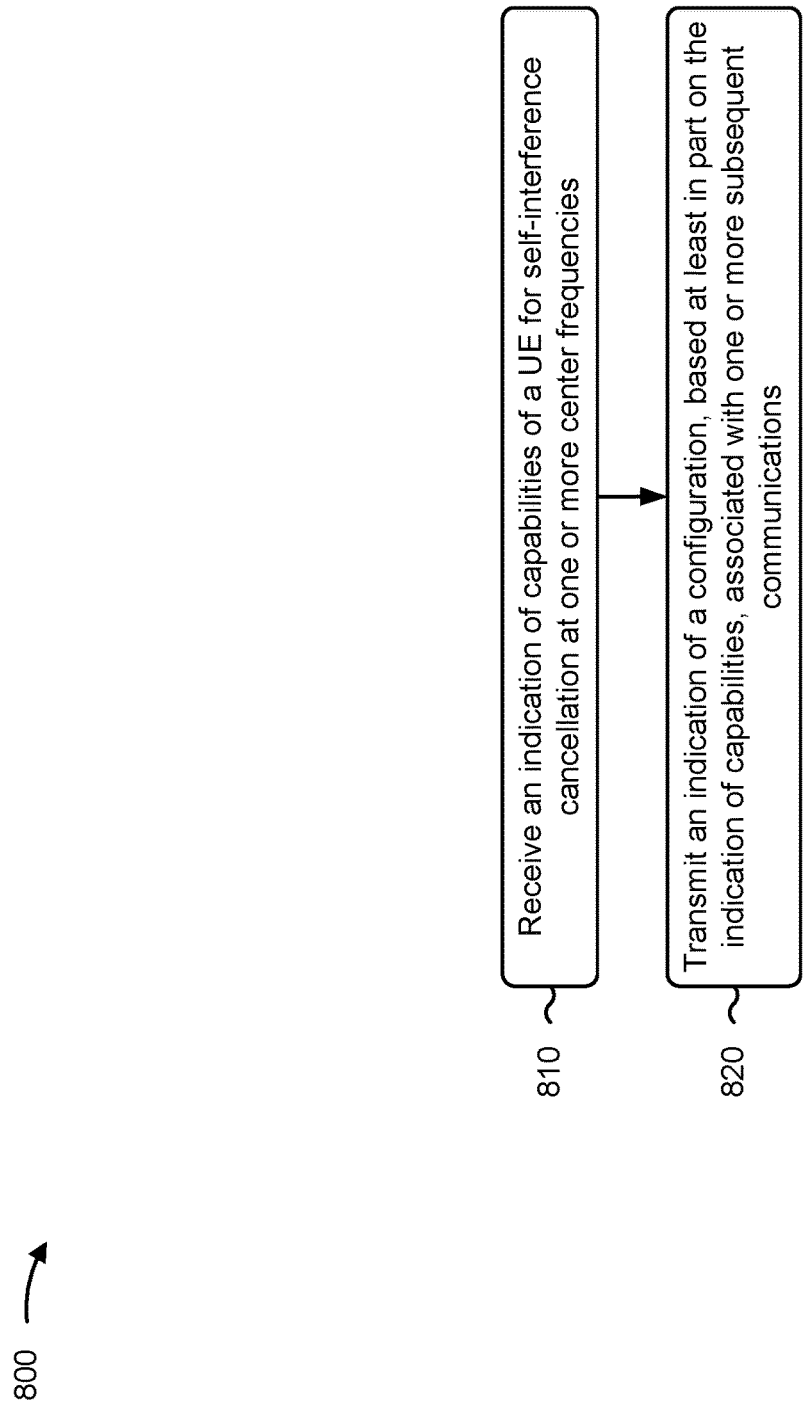

FIG. 8 is a diagram illustrating an example process 800 performed, for example, by a base station, in accordance with the present disclosure. Example process 800 is an example where the base station (e.g., base station 110) performs operations associated with indications of capabilities for self-interference cancellation.

As shown in FIG. 8, in some aspects, process 800 may include receiving an indication of capabilities of a UE for self-interference cancellation at one or more center frequencies (block 810). For example, the base station (e.g., using reception component 1002, depicted in FIG. 10) may receive an indication of capabilities of a UE for self-interference cancellation at one or more center frequencies, as described above.

As further shown in FIG. 8, in some aspects, process 800 may include transmitting an indication of a configuration, based at least in part on the indication of capabilities, associated with one or more subsequent communications (block 820). For example, the base station (e.g., using transmission component 1004, depicted in FIG. 10) may transmit an indication of a configuration, based at least in part on the indication of capabilities, associated with one or more subsequent communications, as described above.

Process 800 may include additional aspects, such as any single aspect or any combination of aspects described below and/or in connection with one or more other processes described elsewhere herein.

In a first aspect, the capabilities for self-interference cancellation are based at least in part on full-duplex communications using overlapping bandwidths.

In a second aspect, alone or in combination with the first aspect, the indication of capabilities comprises an indication that the UE is configured for transmission self-interference cancellation for communications transmitted by the UE using one or more bandwidths that are centered at the one or more center frequencies.

In a third aspect, alone or in combination with one or more of the first and second aspects, the indication of capabilities comprises an indication of one or more modulation and coding schemes that the UE supports for receiving downlink communications when using, for transmitting uplink communications in a full-duplex mode, one or more bandwidths that are centered at the one or more center frequencies.

In a fourth aspect, alone or in combination with one or more of the first through third aspects, the one or more modulation and coding schemes are associated with downlink sub-bands.

In a fifth aspect, alone or in combination with one or more of the first through fourth aspects, the indication of capabilities comprises an indication of one or more additional modulation and coding schemes that the UE supports for receiving downlink communications when using, in a half-duplex mode, one or more bandwidths that are centered at the one or more center frequencies.

In a sixth aspect, alone or in combination with one or more of the first through fifth aspects, the indication of capabilities comprises an indication of one or more uplink bandwidth sizes that the UE supports for communications that are centered at the one or more center frequencies.

In a seventh aspect, alone or in combination with one or more of the first through sixth aspects, the indication of capabilities comprises an indication of an amount of self-interference cancellation that the UE supports for communications that are centered at the one or more center frequencies.

In an eighth aspect, alone or in combination with one or more of the first through seventh aspects, the indication of capabilities comprises an indication of a device type of the UE, and wherein the device type is associated with self-interference cancellation at the one or more center frequencies.

In a ninth aspect, alone or in combination with one or more of the first through eighth aspects, process 800 includes transmitting, to the UE, a request for the indication of capabilities.

In a tenth aspect, alone or in combination with one or more of the first through ninth aspects, the request for the indication of capabilities indicates one or more pairs of uplink allocations and downlink bands for which the UE is to report capabilities for self-interference cancellation.

In an eleventh aspect, alone or in combination with one or more of the first through tenth aspects, receiving the indication of capabilities comprises one or more of receiving the indication of capabilities via a report coupled to a channel state information report, receiving the indication of capabilities via a periodic report, receiving the indication of capabilities via an aperiodic report, or receiving the indication of capabilities via a semi-persistent report.

In a twelfth aspect, alone or in combination with one or more of the first through eleventh aspects, the indication of capabilities comprises an indication of self-interference cancellation that the UE supports at one or more offsets from the one or more center frequencies, or wherein the indication of capabilities comprises an indication of self-interference expected to be caused by communications transmitted by the UE at one or more offsets from the one or more center frequencies.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
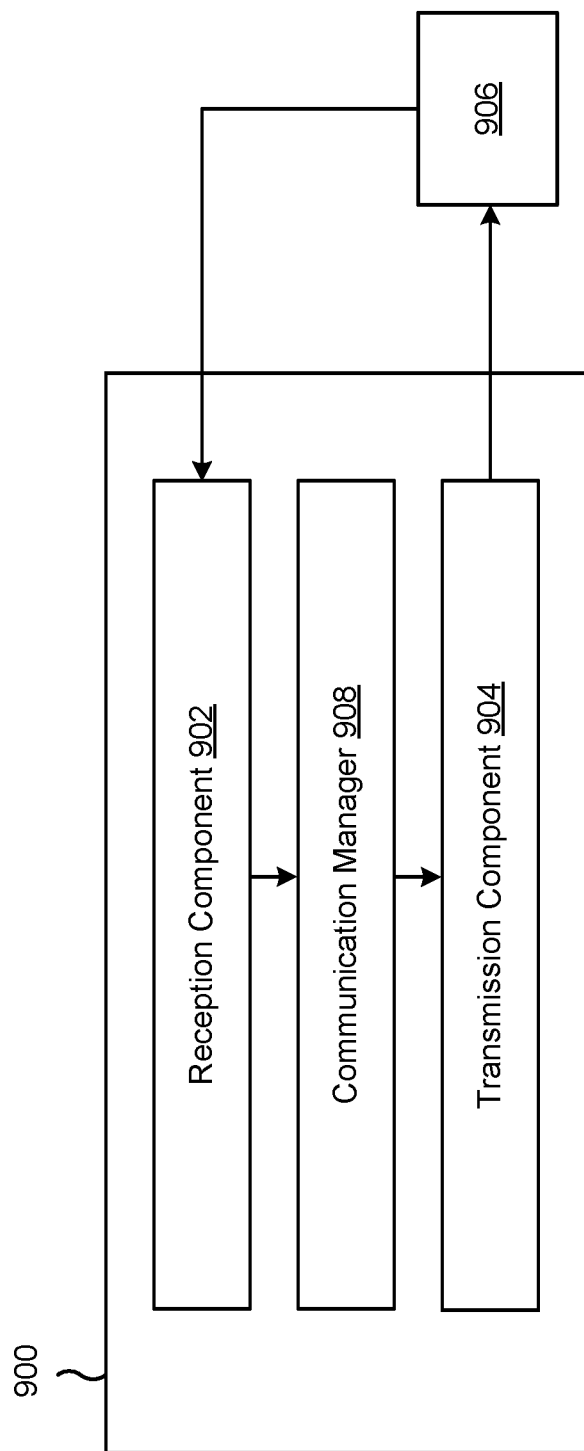
FIGS. 9 and 10 are block diagrams of example apparatuses for wireless communication, in accordance with the present disclosure.

FIG. 9 is a block diagram of an example apparatus 900 for wireless communication. The apparatus 900 may be a UE, or a UE may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include a communication manager 908.

In some aspects, the apparatus 900 may be configured to perform one or more operations described herein in connection with FIG. 6. Additionally, or alternatively, the apparatus 900 may be configured to perform one or more processes described herein, such as process 700 of FIG. 7. In some aspects, the apparatus 900 and/or one or more components shown in FIG. 9 may include one or more components of the UE described above in connection with FIG. 2. Additionally, or alternatively, one or more components shown in FIG. 9 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 906. In some aspects, the reception component 902 may include one or more antennas, a demodulator, a MIMO detector, a receive processor, a controller/processor, a memory, or a combination thereof, of the UE described above in connection with FIG. 2.

The transmission component 904 may transmit communications, such as reference signals, control information, data communications, or a combination thereof, to the apparatus 906. In some aspects, one or more other components of the apparatus 906 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modulator, a transmit MIMO processor, a transmit processor, a controller/processor, a memory, or a combination thereof, of the UE described above in connection with FIG. 2. In some aspects, the transmission component 904 may be co-located with the reception component 902 in a transceiver.

The transmission component 904 may transmit an indication of capabilities of the UE for self-interference cancellation at one or more center frequencies. The reception component 902 may receive an indication of a configuration, based at least in part on the indication of capabilities, associated with one or more subsequent communications.

The reception component 902 may receive a request to transmit the indication of capabilities.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

Figure 10:
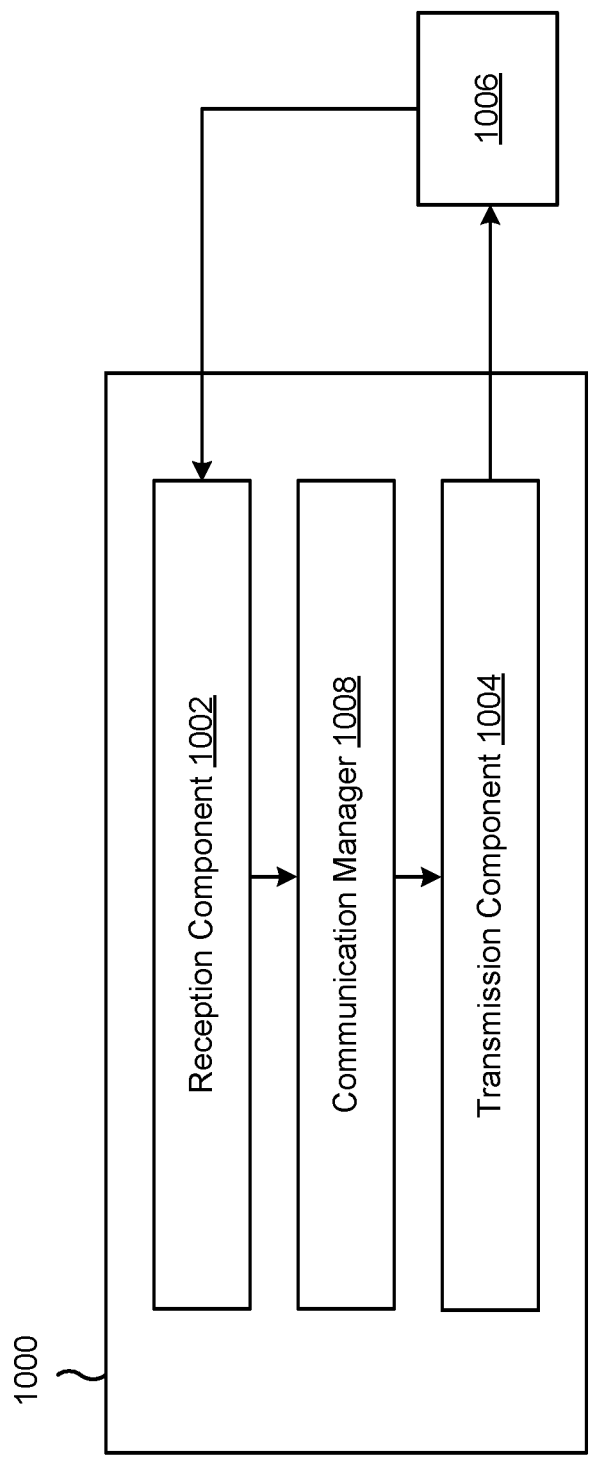

FIG. 10 is a block diagram of an example apparatus 1000 for wireless communication. The apparatus 1000 may be a base station, or a base station may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include a communication manager 1008.

In some aspects, the apparatus 1000 may be configured to perform one or more operations described herein in connection with FIG. 6. Additionally, or alternatively, the apparatus 1000 may be configured to perform one or more processes described herein, such as process 800 of FIG. 8. In some aspects, the apparatus 1000 and/or one or more components shown in FIG. 10 may include one or more components of the base station described above in connection with FIG. 2. Additionally, or alternatively, one or more components shown in FIG. 10 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1006. In some aspects, the reception component 1002 may include one or more antennas, a demodulator, a MIMO detector, a receive processor, a controller/processor, a memory, or a combination thereof, of the base station described above in connection with FIG. 2.

The transmission component 1004 may transmit communications, such as reference signals, control information, data communications, or a combination thereof, to the apparatus 1006. In some aspects, one or more other components of the apparatus 1006 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modulator, a transmit MIMO processor, a transmit processor, a controller/processor, a memory, or a combination thereof, of the base station described above in connection with FIG. 2. In some aspects, the transmission component 1004 may be co-located with the reception component 1002 in a transceiver.

The reception component 1002 may receive an indication of capabilities of a UE for self-interference cancellation at one or more center frequencies. The transmission component 1004 may transmit an indication of a configuration, based at least in part on the indication of capabilities, associated with one or more subsequent communications.

The transmission component 1004 may transmit, to the UE, a request for the indication of capabilities.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

The following provides an overview of some Aspects of the present disclosure:

Aspect 1: A method of wireless communication performed by a user equipment (UE), comprising: transmitting an indication of capabilities of the UE for self-interference cancellation at one or more center frequencies; and receiving an indication of a configuration, based at least in part on the indication of capabilities, associated with one or more subsequent communications.

Aspect 2: The method of Aspect 1, wherein the capabilities for self-interference cancellation are based at least in part on full-duplex communications using overlapping bandwidths.

Aspect 3: The method of any of Aspects 1-2, wherein the indication of capabilities comprises: an indication that the UE is configured for transmission self-interference cancellation for communications transmitted by the UE using one or more bandwidths that are centered at the one or more center frequencies.

Aspect 4: The method of any of Aspects 1-3, wherein the indication of capabilities comprises: an indication of one or more modulation and coding schemes that the UE supports for receiving downlink communications when using, for transmitting uplink communications in a full-duplex mode, one or more bandwidths that are centered at the one or more center frequencies.

Aspect 5: The method of Aspect 4, wherein the one or more modulation and coding schemes are associated with downlink sub-bands.

Aspect 6: The method of Aspect 4, wherein the indication of capabilities comprises: an indication of one or more additional modulation and coding schemes that the UE supports for receiving downlink communications when using, in a half-duplex mode, one or more bandwidths that are centered at the one or more center frequencies.

Aspect 7: The method of any of Aspects 1-6, wherein the indication of capabilities comprises: an indication of one or more uplink bandwidth sizes that the UE supports for communications that are centered at the one or more center frequencies.

Aspect 8: The method of any of Aspects 1-7, wherein the indication of capabilities comprises: an indication of an amount of self-interference cancellation that the UE supports for communications that are centered at the one or more center frequencies.

Aspect 9: The method of any of Aspects 1-8, wherein the indication of capabilities comprises an indication of a device type of the UE, and wherein the device type is associated with self-interference cancellation at the one or more center frequencies.

Aspect 10: The method of any of Aspects 1-9, further comprising: receiving a request to transmit the indication of capabilities.

Aspect 11: The method of Aspect 10, wherein the request to transmit the indication of capabilities indicates one or more pairs of uplink allocations and downlink bands for which the UE is to report capabilities for self-interference cancellation.

Aspect 12: The method of Aspect 10, wherein transmitting the indication of capabilities comprises one or more of: transmitting the indication of capabilities via a report coupled to a channel state information report, transmitting the indication of capabilities via a periodic report, transmitting the indication of capabilities via an aperiodic report, or transmitting the indication of capabilities via a semi-persistent report.

Aspect 13: The method of any of Aspects 1-2, wherein the indication of capabilities comprises an indication of self-interference cancellation that the UE supports at one or more offsets from the one or more center frequencies, or wherein the indication of capabilities comprises an indication of self-interference expected to be caused by communications transmitted by the UE at one or more offsets from the one or more center frequencies.

Aspect 14: A method of wireless communication performed by a base station, comprising: receiving an indication of capabilities of a user equipment (UE) for self-interference cancellation at one or more center frequencies; and transmitting an indication of a configuration, based at least in part on the indication of capabilities, associated with one or more subsequent communications.

Aspect 15: The method of Aspect 14, wherein the capabilities for self-interference cancellation are based at least in part on full-duplex communications using overlapping bandwidths.

Aspect 16: The method of any of Aspects 14-15, wherein the indication of capabilities comprises: an indication that the UE is configured for transmission self-interference cancellation for communications transmitted by the UE using one or more bandwidths that are centered at the one or more center frequencies.

Aspect 17: The method of any of Aspects 14-16, wherein the indication of capabilities comprises: an indication of one or more modulation and coding schemes that the UE supports for receiving downlink communications when using, for transmitting uplink communications in a full-duplex mode, one or more bandwidths that are centered at the one or more center frequencies.

Aspect 18: The method of Aspect 17, wherein the one or more modulation and coding schemes are associated with downlink sub-bands.

Aspect 19: The method of Aspect 17, wherein the indication of capabilities comprises: an indication of one or more additional modulation and coding schemes that the UE supports for receiving downlink communications when using, in a half-duplex mode, one or more bandwidths that are centered at the one or more center frequencies.

Aspect 20: The method of any of Aspects 14-19, wherein the indication of capabilities comprises: an indication of one or more uplink bandwidth sizes that the UE supports for communications that are centered at the one or more center frequencies.

Aspect 21: The method of any of Aspects 14-20, wherein the indication of capabilities comprises: an indication of an amount of self-interference cancellation that the UE supports for communications that are centered at the one or more center frequencies.

Aspect 22: The method of any of Aspects 14-21, wherein the indication of capabilities comprises an indication of a device type of the UE, and wherein the device type is associated with self-interference cancellation at the one or more center frequencies.

Aspect 23: The method of any of Aspects 14-22, further comprising: transmitting, to the UE, a request for the indication of capabilities.

Aspect 24: The method of Aspect 23, wherein the request for the indication of capabilities indicates one or more pairs of uplink allocations and downlink bands for which the UE is to report capabilities for self-interference cancellation.

Aspect 25: The method of Aspect 23, wherein receiving the indication of capabilities comprises one or more of: receiving the indication of capabilities via a report coupled to a channel state information report, receiving the indication of capabilities via a periodic report, receiving the indication of capabilities via an aperiodic report, or receiving the indication of capabilities via a semi-persistent report.

Aspect 26: The method of any of Aspects 14-25, wherein the indication of capabilities comprises an indication of self-interference cancellation that the UE supports at one or more offsets from the one or more center frequencies, or wherein the indication of capabilities comprises an indication of self-interference expected to be caused by communications transmitted by the UE at one or more offsets from the one or more center frequencies.

Aspect 27: An apparatus for wireless communication at a device, comprising a processor; memory coupled with the processor; and instructions stored in the memory and executable by the processor to cause the apparatus to perform the method of one or more of Aspects 1-26.

Aspect 28: A device for wireless communication, comprising a memory and one or more processors coupled to the memory, the memory and the one or more processors configured to perform the method of one or more of Aspects 1-26.

Aspect 29: An apparatus for wireless communication, comprising at least one means for performing the method of one or more of Aspects 1-26.

Aspect 30: A non-transitory computer-readable medium storing code for wireless communication, the code comprising instructions executable by a processor to perform the method of one or more of Aspects 1-26.

Aspect 31: A non-transitory computer-readable medium storing a set of instructions for wireless communication, the set of instructions comprising one or more instructions that, when executed by one or more processors of a device, cause the device to perform the method of one or more of Aspects 1-26.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
   a memory; and
   one or more processors, coupled to the memory, configured to:
      transmit an indication of capabilities of the UE for self-interference cancellation at one or more center frequencies,
      the indication of capabilities comprising:
         an indication of self-interference cancellation that the UE supports at one or more offsets from the one or more center frequencies, or
         an indication of self-interference expected to be caused by communications transmitted by the UE at one or more offsets from the one or more center frequencies; and
      receive an indication of a configuration associated with the indication of capabilities, the configuration being associated with one or more subsequent communications.

2. The UE of claim 1, wherein the capabilities for self-interference cancellation are associated with full-duplex communications using overlapping bandwidths.

3. The UE of claim 1, wherein the indication of capabilities comprises:
   an indication that the UE is configured for transmission self-interference cancellation for communications transmitted by the UE using one or more bandwidths that are centered at the one or more center frequencies.

4. The UE of claim 1, wherein the indication of capabilities comprises:
   an indication of one or more modulation and coding schemes that the UE supports for receiving downlink communications when using, for transmitting uplink communications in a full-duplex mode, one or more bandwidths that are centered at the one or more center frequencies.

5. The UE of claim 4, wherein the one or more modulation and coding schemes are associated with downlink sub-bands.

6. The UE of claim 4, wherein the indication of capabilities comprises:
   an indication of one or more additional modulation and coding schemes that the UE supports for receiving downlink communications when using, in a half-duplex mode, one or more bandwidths that are centered at the one or more center frequencies.

7. The UE of claim 1, wherein the indication of capabilities comprises:
   an indication of one or more uplink bandwidth sizes that the UE supports for communications that are centered at the one or more center frequencies.

8. The UE of claim 1, wherein the indication of capabilities comprises:
   an indication of an amount of self-interference cancellation that the UE supports for communications that are centered at the one or more center frequencies.

9. The UE of claim 1, wherein the indication of capabilities comprises an indication of a device type of the UE, and wherein the device type is associated with self-interference cancellation at the one or more center frequencies.

10. The UE of claim 1, wherein the one or more processors are further configured to:
    receive a request to transmit the indication of capabilities.

11. The UE of claim 10, wherein the request to transmit the indication of capabilities indicates one or more pairs of uplink allocations and downlink bands for which the UE is to report capabilities for self-interference cancellation.

12. The UE of claim 10, wherein the one or more processors, to transmit the indication of capabilities, are configured to:
    transmit the indication of capabilities via a report coupled to a channel state information report,
    transmit the indication of capabilities via a periodic report,
    transmit the indication of capabilities via an aperiodic report, or
    transmit the indication of capabilities via a semi-persistent report.

13. A method of wireless communication performed by a user equipment (UE), comprising:
    transmitting an indication of capabilities of the UE for self-interference cancellation at one or more center frequencies,
       the indication of capabilities comprising:
          an indication of self-interference cancellation that the UE supports at one or more offsets from the one or more center frequencies, or
          an indication of self-interference expected to be caused by communications transmitted by the UE at one or more offsets from the one or more center frequencies; and
    receiving an indication of a configuration associated with the indication of capabilities, the configuration being associated with one or more subsequent communications.

14. The method of claim 13, wherein the capabilities for self-interference cancellation are associated with full-duplex communications using overlapping bandwidths.

15. The method of claim 13, wherein the indication of capabilities comprises:
    an indication that the UE is configured for transmission self-interference cancellation for communications transmitted by the UE using one or more bandwidths that are centered at the one or more center frequencies.

16. The method of claim 13, wherein the indication of capabilities comprises:
    an indication of one or more modulation and coding schemes that the UE supports for receiving downlink communications when using, for transmitting uplink communications in a full-duplex mode, one or more bandwidths that are centered at the one or more center frequencies.

17. The method of claim 16, wherein the one or more modulation and coding schemes are associated with downlink sub-bands.

18. The method of claim 16, wherein the indication of capabilities comprises:
an indication of one or more additional modulation and coding schemes that the UE supports for receiving downlink communications when using, in a half-duplex mode, one or more bandwidths that are centered at the one or more center frequencies.

19. The method of claim 13, wherein the indication of capabilities comprises:
an indication of one or more uplink bandwidth sizes that the UE supports for communications that are centered at the one or more center frequencies.

20. The method of claim 13, wherein the indication of capabilities comprises:
an indication of an amount of self-interference cancellation that the UE supports for communications that are centered at the one or more center frequencies.

21. The method of claim 13, wherein the indication of capabilities comprises an indication of a device type of the UE, and
wherein the device type is associated with self-interference cancellation at the one or more center frequencies.

22. The method of claim 13, further comprising:
receiving a request to transmit the indication of capabilities.

23. The method of claim 22, wherein the request to transmit the indication of capabilities indicates one or more pairs of uplink allocations and downlink bands for which the UE is to report capabilities for self-interference cancellation.

24. The method of claim 22, wherein transmitting the indication of capabilities comprises one or more of:
transmitting the indication of capabilities via a report coupled to a channel state information report,
transmitting the indication of capabilities via a periodic report,
transmitting the indication of capabilities via an aperiodic report, or
transmitting the indication of capabilities via a semi-persistent report.

25. A method of wireless communication performed by a base station comprising:
receiving an indication of capabilities of a user equipment (UE) for self-interference cancellation at one or more center frequencies,
the indication of capabilities comprising:
an indication of self-interference cancellation that the UE supports at one or more offsets from the one or more center frequencies, or
an indication of self-interference expected to be caused by communications transmitted by the UE at one or more offsets from the one or more center frequencies; and
transmitting an indication of a configuration associated with the indication of capabilities, the configuration being associated with one or more subsequent communications.

26. The method of claim 25, wherein the capabilities for self-interference cancellation are associated with full-duplex communications using overlapping bandwidths.

27. The method of claim 25, wherein the indication of capabilities comprises:
an indication that the UE is configured for transmission self-interference cancellation for communications transmitted by the UE using one or more bandwidths that are centered at the one or more center frequencies.

28. A base station for wireless communication, comprising:
a memory; and
one or more processors, coupled to the memory, configured to:
receive an indication of capabilities of a user equipment (UE) for self-interference cancellation at one or more center frequencies,
the indication of capabilities comprising:
an indication of self-interference cancellation that the UE supports at one or more offsets from the one or more center frequencies, or
an indication of self-interference expected to be caused by communications transmitted by the UE at one or more offsets from the one or more center frequencies; and
transmit an indication of a configuration associated with the indication of capabilities, the configuration being associated with one or more subsequent communications.

29. The base station of claim 28, wherein the capabilities for self-interference cancellation are associated with full-duplex communications using overlapping bandwidths.

30. The base station of claim 28, wherein the indication of capabilities comprises:
an indication that the UE is configured for transmission self-interference cancellation for communications transmitted by the UE using one or more bandwidths that are centered at the one or more center frequencies.

* * * * *